US006659211B2

(12) United States Patent
Esposito

(10) Patent No.: US 6,659,211 B2
(45) Date of Patent: Dec. 9, 2003

(54) INVALID MOBILE CART WITH ENCLOSURE

(76) Inventor: Charles Esposito, 121 Hillside Ave., Hasbrouck Heights, NJ (US) 07604

( * ) Notice: Subject to any disclaimer, the term of this patent is extended or adjusted under 35 U.S.C. 154(b) by 0 days.

(21) Appl. No.: 10/059,508

(22) Filed: Jan. 31, 2002

(65) Prior Publication Data

US 2003/0141120 A1 Jul. 31, 2003

(51) Int. Cl.$^7$ .................................................. B60K 1/00

(52) U.S. Cl. ........................ 180/65.1; 180/907; 135/66; 296/77.1; 296/190.01

(58) Field of Search .............................. 180/65.1, 65.5, 180/65.6, 907; 135/66, 65, 67; 296/77.1, 78.1, 190, 102, 200; 280/304.1, 250.1

(56) References Cited

U.S. PATENT DOCUMENTS 1,890,396 A * 12/1932 Maphet ....................... 135/66
2,989,139 A * 6/1961 Pantek et al. ................. 182/15
3,709,553 A * 1/1973 Churchill et al. ........... 296/145
3,872,945 A * 3/1975 Hickman et al. .......... 180/65.6
4,013,315 A * 3/1977 West ........................... 296/83
4,133,574 A * 1/1979 Martin .................. 296/190.09
4,284,157 A * 8/1981 Lay ........................... 180/65.1
4,389,057 A * 6/1983 Richard, Jr. ............. 280/304.1
4,390,076 A * 6/1983 Wier et al. .................... 180/11
4,412,595 A * 11/1983 Kinzel ........................ 180/211
4,437,537 A * 3/1984 Ausmus ...................... 180/313
4,456,086 A * 6/1984 Wier et al. .................... 180/11
D280,089 S * 8/1985 Blower ...................... D12/128
4,621,859 A * 11/1986 Spicher ..................... 296/77.1
4,623,194 A * 11/1986 Pillot ........................ 296/77.1
4,633,962 A * 1/1987 Cox et al. .................. 180/65.1
4,652,037 A * 3/1987 Thau et al. ................ 296/77.1
D291,878 S * 9/1987 Cook ........................ D12/405
4,700,632 A * 10/1987 Schmutz ...................... 104/63
4,773,694 A * 9/1988 Gerber ...................... 296/77.1
4,802,542 A * 2/1989 Houston et al. ........... 180/65.5
4,809,804 A * 3/1989 Houston et al. ........... 180/65.5
4,949,740 A * 8/1990 Friday ......................... 135/90
5,096,214 A * 3/1992 Walker et al. ........... 280/47.26
5,203,601 A * 4/1993 Guillot ...................... 296/77.1
5,265,689 A * 11/1993 Kauffmann ................ 180/65.5
5,366,036 A * 11/1994 Perry ........................ 180/65.1
5,393,118 A * 2/1995 Welborn ..................... 296/147
D365,527 S * 12/1995 Peterson et al. ............. D10/78
5,701,968 A * 12/1997 Wright-Ott et al. ........ 180/65.1
5,890,507 A * 4/1999 Hinsperger .................. 135/96
6,053,519 A * 4/2000 Poindexter et al. ...... 280/250.1
6,182,778 B1 * 2/2001 Henshaw et al. ........ 180/89.12
6,279,986 B1 * 8/2001 Hinsperger ................. 296/102
6,397,961 B1 * 6/2002 Sutton ....................... 180/65.1
6,446,742 B1 * 9/2002 Wilson ...................... 180/65.6

* cited by examiner

*Primary Examiner*—Brian L. Johnson
*Assistant Examiner*—Kelly E Campbell
(74) *Attorney, Agent, or Firm*—Anthony D. Cipollone

(57) ABSTRACT

An invalid mobile cart with enclosure (10) having a cart (12) which has a cart top (12T), cart bottom (12A), cart left (12L), cart right (12R), cart front (12F), cart back (12B), at least one cart front wheel, cart rear right wheel (12DRR) and cart rear left wheel (not shown) rotatably and extending downwardly from the cart bottom (12A). At least one wheel is connected to a motor (not shown). A transparent or translucent enclosure (14) is securely mounted on the cart top (12T). The enclosure (14) has an enclosure housing (14A) having a enclosure left door (14L) and enclosure right door (14R) hingeably connected thereto. A steering/control (16) means is positioned on the cart top (12T) at the cart front (12F). The steering/control (16) has a steering/control wheel (16A) connected to a steering/control column (16B) which is connected to the at least one cart front wheel and the motor. A support (18) positioned on the cart top (12T) at the cart back (12B). The support (18) has a butt support (18A) connected to a top distal end of a lower support (18L) which is securely attached to the cart top (12T). The lower support (18L) rigidly holds a user's legs (20C).

2 Claims, 3 Drawing Sheets

INVALID MOBILE CART WITH ENCLOSURE

FIELD OF THE INVENTION

The present invention relates to a device for self-transporting invalids. More particularly, the present invention relates to an invalid cart with enclosure.

DESCRIPTION OF THE PRIOR ART

Numerous innovations for an invalid carts have been provided in the prior art that are described as follows. Even though these innovations may be suitable for the specific individual purposes to which they address, they differ from the present invention as hereinafter contrasted.

In U.S. Pat. No. , 5,265,689, invented by, Kauffmann, titled, Prosthetic device for lifting and lowering a person thereon, a prosthetic device operable by a handicapped user of the device for physically lifting and lowering the user's body to and supporting the user's body in an upright standing position and a sitting position. The disclosed prosthetic embodiments are motorized wheel chairs.

In U.S. Pat. No. , 4,623,194, invented by, Pillot, titled, Body-supporting device for wheelchair for handicapped person comprising a structure allowing an upright position, a body-supporting device for wheelchair for handicapped person is characterized in that it comprises: a first set of means comprising two rigid segments, each mounted on the backrest by an articulated system which blocks the segment in a vertical orientation as armrest or horizontal orientation asthoracic half-belt, and a second set of means comprising two cradel elements adapted to be immobilized in the same horizontal plane in alignment to form open leg guards fitting over the front of the subject's legs. The invention is applicable to wheelchairs.

The patented inventions differ from the present invention because the patented inventions lack the following functional features depicted in the invention: butt rest and back support with lower extremity harness apparatus to hold person in upright position; narrow entrance with front openable doors; steering column and apparatus; movable cart similar to a lawn mower with electric motor; and optional accessories such as grocery bag holder.

Numerous innovations for an invalid cart have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to a device for self-transporting invalids. More particularly, the present invention relates to an invalid cart with enclosure.

The types of problems encountered in the prior art are that invalid carts lack the support means for persons with severe handicaps.

In the prior art, unsuccessful attempts to solve this problem were attempted namely: sit down carts. However, the problem was solved by the present invention because in included support means for a person in an upright position.

Innovations within the prior art are rapidly being exploited in the field of invalid accessories.

The present invention went contrary to the teaching of the art which describes and claims mobile sit down carts.

The present invention solved a long felt need for a mobile cart that allows an invalid to stand upright with the associated supports.

A synergistic effect was produced utilizing the present invention due to the following facts and results from experimentation: the upright position increased blood circulation in the invalid reducing the occurrence of bed sores and clotting problems.

Accordingly, it is an object of the present invention to provide an invalid mobile cart with enclosure having a cart, enclosure, steering/control, and support.

More particularly, it is an object of the present invention to provide the cart having a cart top, cart bottom, cart left, cart right, cart front, cart back, cart front right wheel, cart front left wheel, cart rear right wheel, and cart rear left wheel.

In keeping with these objects, and with others which will become apparent hereinafter, one feature of the present invention resides, briefly stated, in the enclosure having an enclosure housing, enclosure left door, and enclosure right door.

When the invention, steering/control is designed in accordance with the present, it has a steering/control wheel and steering/control column.

In accordance with another feature of the present invention, the support has a butt support, lower support, and upper support.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10—invalid mobile cart with enclosure (10)
12—cart (12)
12T—cart top (12T)
12A—cart bottom (12A)
12L—cart left (12L)
12R—cart right (12R)
12F—cart front (12F)
12B—cart back (12B)
12DFR—cart front right wheel (12DFR)
12DFL—cart front left wheel (12DFL)
12DRR—cart rear right wheel (12DRR)
12DRL—cart rear left wheel (not shown)
14—enclosure (14)
14A—enclosure housing (14A)
14L—enclosure left door (14L)
14R—enclosure right door (14R)
16—steering/control (16)
6A—steering/control wheel (16A)
16B—steering/control column (16B)
18—support (18)
18A—butt support (18A)
18L—lower support (18L)
18U—upper support (18U)
20—user (20)
20A—user's head (20A)
20B—user's back (20B)
20C—user's legs (20C)
20L—user's left arm (20L)
20R—user's right arm (20R)

DESCRIPTION OF THE PREFERRED EMBODIMENT

Figure 1:
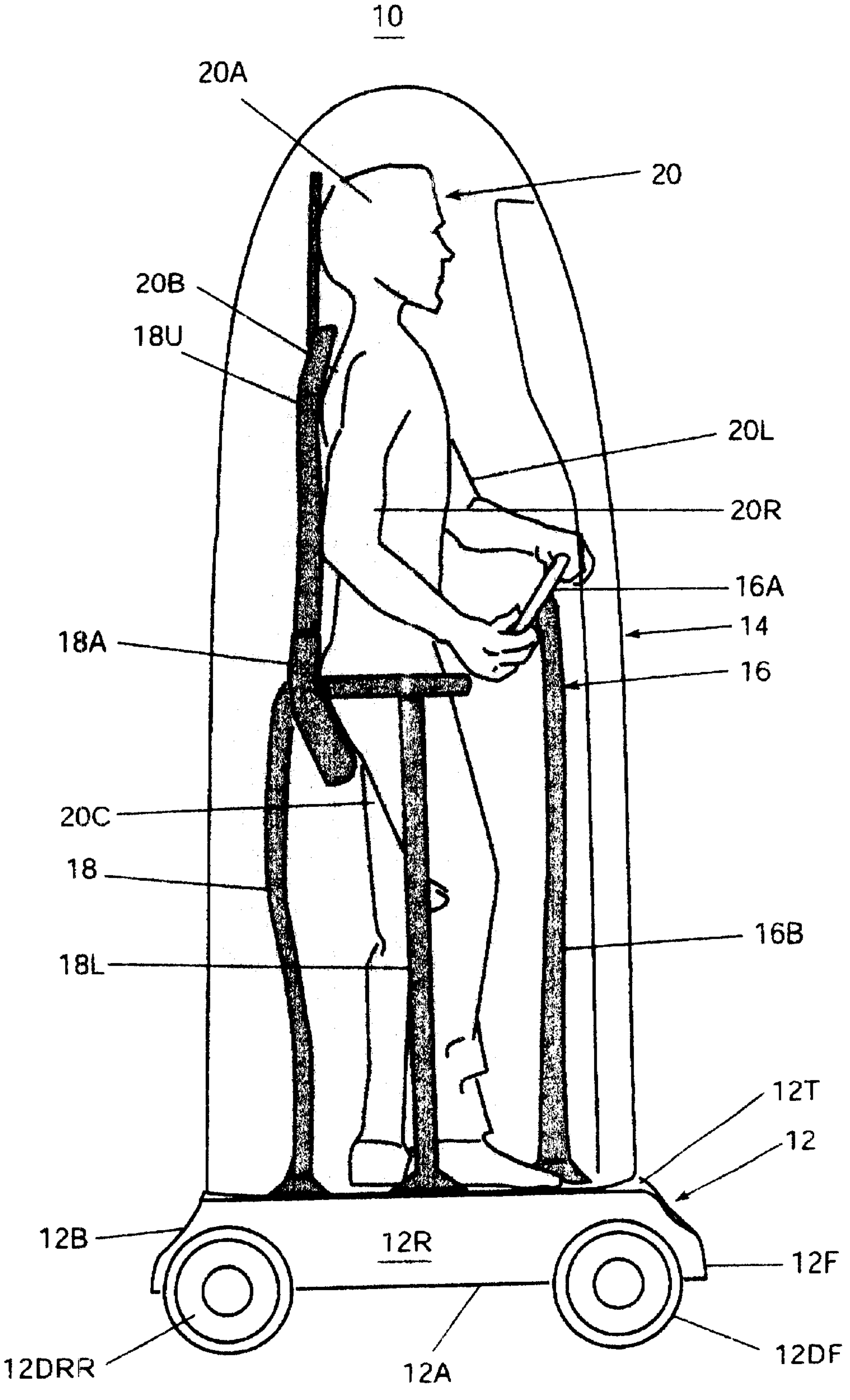
FIG. 1 is a right side view of an invalid mobile cart with enclosure (10).

Referring to FIG. 1 which is a right side view of an invalid mobile cart with enclosure (10) comprising a cart (12) which comprises a cart top (12T), cart bottom (12A), cart left (12L), cart right (12R), cart front (12F), cart back (12B), at least one cart front wheel, cart rear right wheel (12DRR) and cart rear left wheel (not shown) rotatably and extending downwardly from the cart bottom (12A). At least one wheel is connected to a motor (not shown). The at least one cart front wheel preferably comprises a cart front right wheel (12DFR) and a cart front left wheel (12DFL) connected to the steering/control column (16B).

Figure 2:
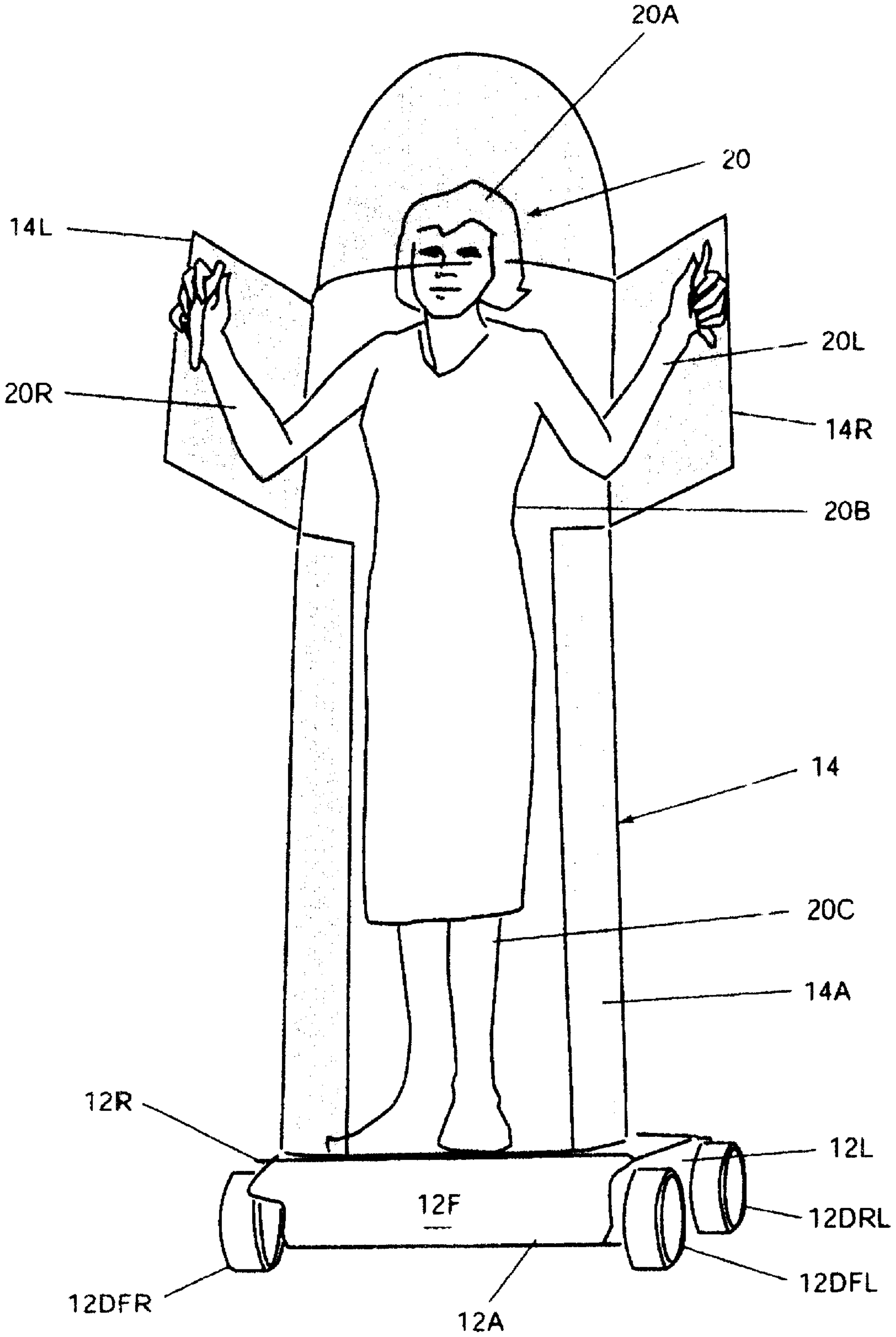
FIG. 2 is a front view of an invalid mobile cart with enclosure (10).

The invalid mobile cart (10) further comprises a transparent or translucent enclosure (14) is securely mounted on the cart top (12T). The enclosure (14) comprises an enclosure housing (14A) having a enclosure left door (14L) and enclosure right door (14R) hingeably connected thereto. (Refer to FIG. 2) The enclosure (14) is preferably manufactured from plexiglass or lexan(TM).

Figure 3:
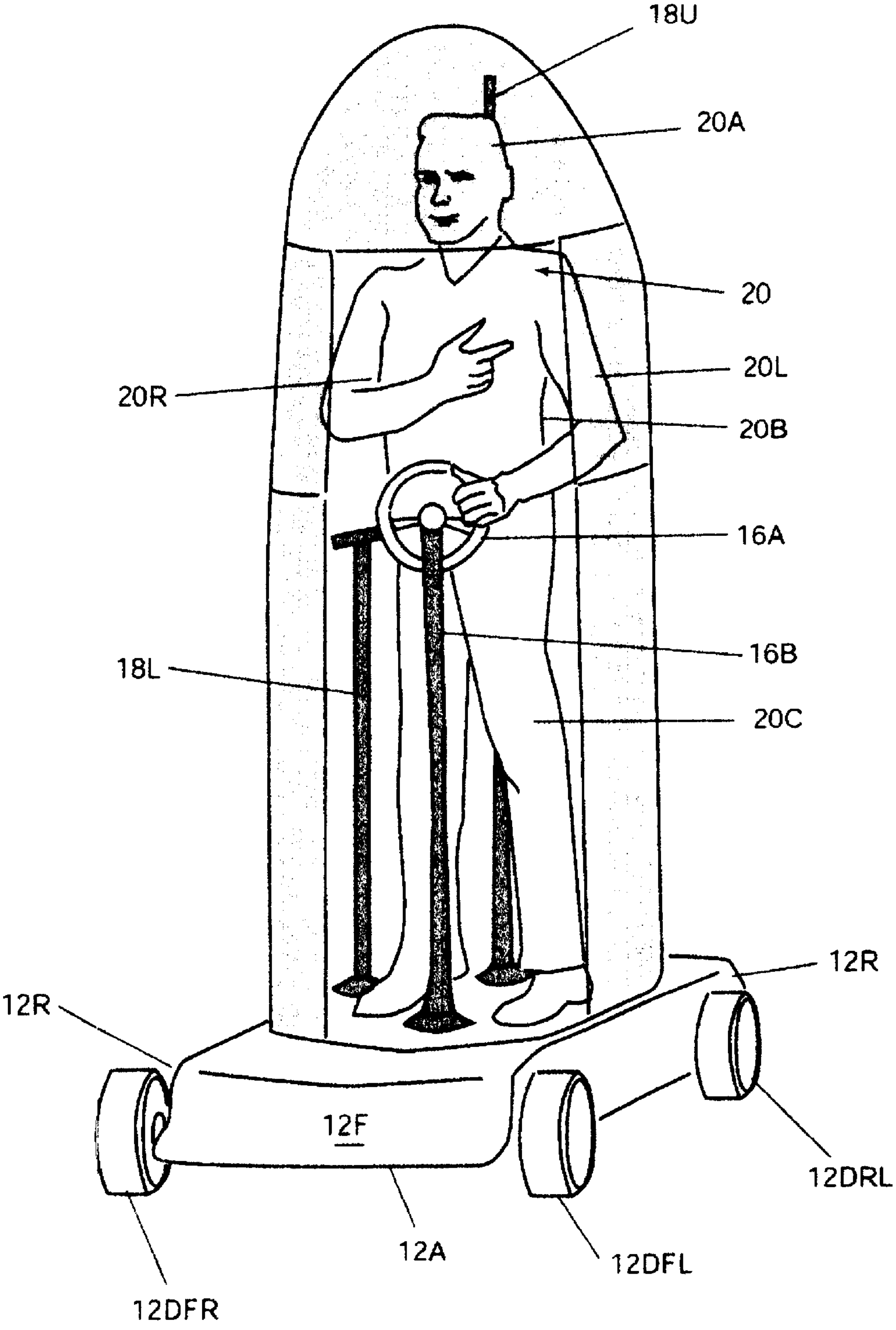
FIG. 3 is a front-left view of an invalid mobile cart with enclosure (10).

The invalid mobile cart (10) further comprises a steering/control (16) means positioned on the cart top (12T) at the cart front (12F). The steering/control (16) comprises a steering/control wheel (16A) connected to a steering/control column (16B) which is connected to the at least one cart front wheel and the motor. (Refer to FIG. 3)

The invalid mobile cart (10) further comprises a support (18) which functions to hold a user (20) in an upright position. The support (18) is positioned on the cart top (12T) at the cart back (12B). The support (18) comprises a butt support (18A) connected to a top distal end of a lower support (I 8L) which is securely attached to, the cart top (12T). The lower support (18L) rigidly holds a user's legs (20C) the support (18) preferably further comprises an upper support (18U) securely fasted to and extending upwardly from the lower support (18L) functioning to hold a user's head (20A) and user's back (20B) in an upright position.

It will be understood that each of the elements described above, or two or more together, may also find a useful application in other types of constructions differing from the type described above.

While the invention has been illustrated and described as embodied in an invalid cart, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An invalid mobile cart with an enclosure comprising:

a cart which further comprises a cart top surface, a cart bottom surface, a cart left surface, a cart right surface, a cart front surface, a cart back surface, at least one cart front wheel pivotable for steering, a cart rear right wheel and a cart rear left wheel rotatably and extending downwardly from the cart bottom surface, at least one wheel is connected to a motor;

a transparent or translucent enclosure of rigid material, securely mounted on the cart top surface and extending vertically there from;

the enclosure comprising a housing defining a space for receiving a standing occupant and having a narrow front entryway defined by an enclosure left front door and enclosure right front door hingably connected to the housing;

said enclosure left front door and enclosure right front door positioned in front of and spaced from said standing occupant when in a closed position for protecting the occupant;

said cart top surface being a platform in a horizontal plane for supporting said standing occupant;

a steering control means disposed on the cart top surface and centrally positioned towards a front end of the cart top surface, the steering control means comprising a steering control wheel connected to a steering column of a height sufficient to be used by a standing occupant, the steering control column being connected to at least one cart front wheel and said motor to maneuver said cart in response to rotation of the steering control wheel;

and an occupant support disposed on the cart top surface and positioned towards a rear end of the cart top surface, the occupant support comprising a posterior body support connected to a top distal end of a lower body support which is securely attached to the cart top surface, an upper body support securely fastened to and extending upwardly from the lower body support functioning to support a user's back in an upright position;

wherein the upper body support has a distal end functioning to support a user's head; and wherein the lowe body sopport rigidly supports a user's legs.

2. The invalid mobile cart with enclosure as described in claim 1, wherein the rigid material of the enclosure is manufactured from plexiglass.

* * * * *